US012643475B2

(12) United States Patent
Wu et al.

(10) Patent No.: US 12,643,475 B2
(45) Date of Patent: Jun. 2, 2026

(54) INDIRECT VISION SYSTEM, INDIRECT VISION DISPLAY METHOD, AND INTERACTIVE ELECTRONIC REARVIEW MIRROR SYSTEM FOR VEHICLES

(71) Applicant: GUANGZHOU LUXVISIONS INNOVATION TECHNOLOGY LIMITED, Guangzhou City (CN)

(72) Inventors: Tsung-Che Wu, Guangzhou City (CN); Chien-Hung Tung, Guangzhou City (CN)

(73) Assignee: GUANGZHOU LUXVISIONS INNOVATION TECHNOLOGY LIMITED, Guangzhou City (CN)

( * ) Notice: Subject to any disclaimer, the term of this patent is extended or adjusted under 35 U.S.C. 154(b) by 43 days.

(21) Appl. No.: 18/983,135

(22) Filed: Dec. 16, 2024

(65) Prior Publication Data

US 2025/0368135 A1 Dec. 4, 2025

(30) Foreign Application Priority Data

Jun. 4, 2024 (CN) .......................... 202410716278.2

(51) Int. Cl.
*B60R 1/26* (2022.01)
*B60R 1/04* (2006.01)
*B60R 1/12* (2006.01)

(52) U.S. Cl.
CPC ................. *B60R 1/26* (2022.01); *B60R 1/04* (2013.01); *B60R 1/12* (2013.01); *B60R 2001/1253* (2013.01); *B60R 2300/105* (2013.01); *B60R 2300/303* (2013.01); *B60R 2300/306* (2013.01); *B60R 2300/8026* (2013.01)

(58) Field of Classification Search
CPC .... B60R 1/26; B60R 1/04; B60R 1/12; B60R 2001/1253; B60R 2300/105; B60R 2300/303; B60R 2300/306; B60R 2300/8026; B60R 1/28
See application file for complete search history.

(56) References Cited

U.S. PATENT DOCUMENTS

| | | | | |
|---|---|---|---|---|
| 9,073,493 B1 * | 7/2015 | Yun | ...................... | G02B 7/1827 |
| 10,239,455 B2 * | 3/2019 | Eberhard | ................ | G06F 3/012 |
| 10,994,656 B2 * | 5/2021 | Autran | ................... | H04N 7/181 |
| 11,220,214 B1 * | 1/2022 | Meier | .................... | G06V 20/56 |
| 11,694,448 B2 * | 7/2023 | Bronte | ................... | G06V 40/28 |
| | | | | 348/148 |

(Continued)

*Primary Examiner* — James M Pontius
(74) *Attorney, Agent, or Firm* — HDLS IPR SERVICES; Chun-Ming Shih

(57) ABSTRACT

The indirect vision system includes a first camera device, a second camera device, a display device, and a processor. The first camera device shoots towards a first scene to capture a first image frame. The second camera device shoots towards a second scene to capture a second image frame. The display device is connected to the second camera device and displays the second image frame. The processor computes a six-axis moving direction of a target point in a three-dimensional space by using the current first image frame and another first image frame of a reference time; computes a displacement between the target point and the display device in the six-axis moving direction; and changes a field of view of the second image frame shown on the display device according to the displacement.

20 Claims, 13 Drawing Sheets

(56)           References Cited

U.S. PATENT DOCUMENTS

| | | | | |
|---|---|---|---|---|
| 12,277,727 | B2 * | 4/2025 | Metzler | H04N 23/695 |
| 12,356,120 | B2 * | 7/2025 | Weiblen | G06F 3/011 |
| 12,479,365 | B2 * | 11/2025 | Zhang | B60R 1/12 |
| 2002/0003571 | A1 * | 1/2002 | Schofield | B60C 23/00 |
| | | | | 348/148 |
| 2008/0278821 | A1 * | 11/2008 | Rieger | H04N 13/344 |
| | | | | 359/630 |
| 2009/0058845 | A1 * | 3/2009 | Fukuda | G02F 1/1323 |
| | | | | 345/214 |
| 2013/0038732 | A1 * | 2/2013 | Waite | B60R 1/30 |
| | | | | 348/148 |
| 2016/0137126 | A1 * | 5/2016 | Fürsich | B60R 1/26 |
| | | | | 348/148 |
| 2017/0282806 | A1 * | 10/2017 | Peterson | B60R 1/082 |
| 2017/0302914 | A1 * | 10/2017 | Tonar | H04N 13/383 |
| 2018/0050639 | A1 * | 2/2018 | Eberhard | B60W 50/14 |
| 2018/0178729 | A1 * | 6/2018 | Festerling, Jr | G06V 20/59 |
| 2018/0281685 | A1 * | 10/2018 | Tschirhart | B60R 1/12 |
| 2018/0304814 | A1 * | 10/2018 | Tschirhart | B60R 1/26 |
| 2018/0316868 | A1 * | 11/2018 | Tschirhart | H04N 7/183 |
| 2018/0334100 | A1 * | 11/2018 | Tschirhart | H04N 23/61 |
| 2019/0075253 | A1 * | 3/2019 | Wada | H04N 23/63 |
| 2019/0100156 | A1 * | 4/2019 | Chung | B60R 1/26 |
| 2019/0146297 | A1 * | 5/2019 | Lynam | G02F 1/153 |
| | | | | 359/265 |
| 2019/0197327 | A1 * | 6/2019 | Mangla | G06V 20/588 |
| 2020/0231091 | A1 * | 7/2020 | Hayashida | H04N 7/181 |
| 2022/0083794 | A1 * | 3/2022 | Bronte | G06F 3/017 |
| 2022/0185183 | A1 * | 6/2022 | Kida | B60R 1/27 |
| 2024/0069351 | A1 * | 2/2024 | Hong | G06F 3/04812 |
| 2025/0001936 | A1 * | 1/2025 | Goral | G06V 20/597 |
| 2025/0388175 | A1 * | 12/2025 | Lee | B60R 1/28 |

* cited by examiner

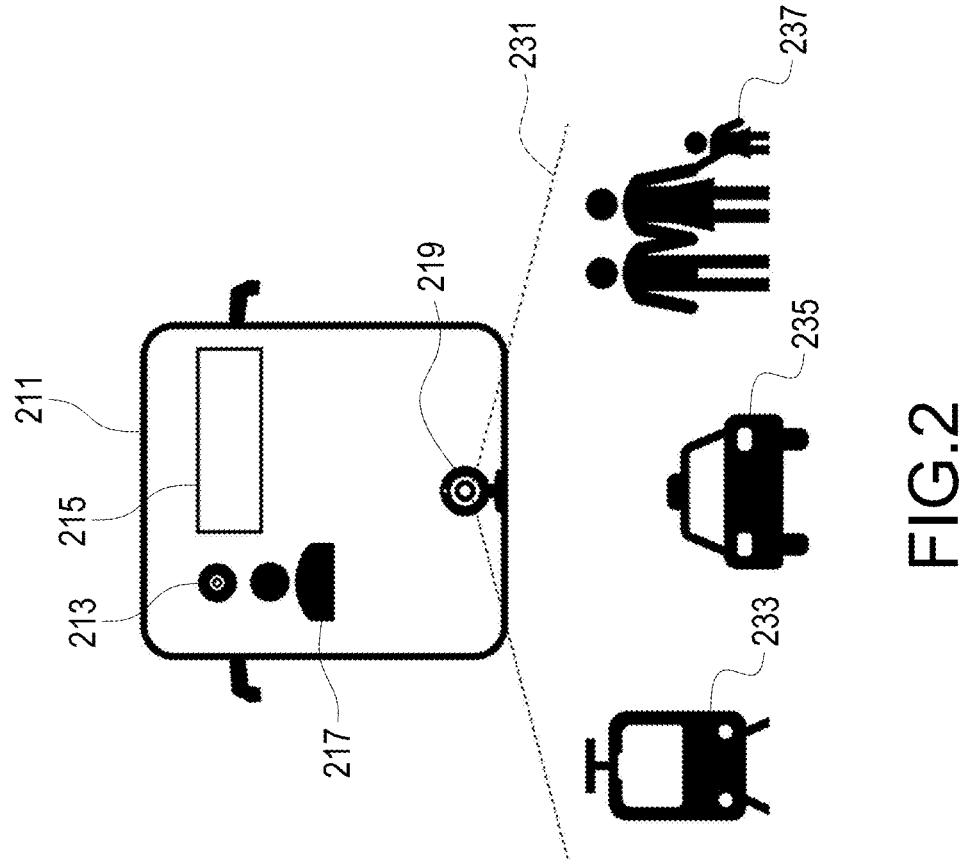
FIG.2
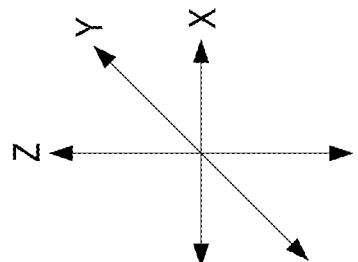

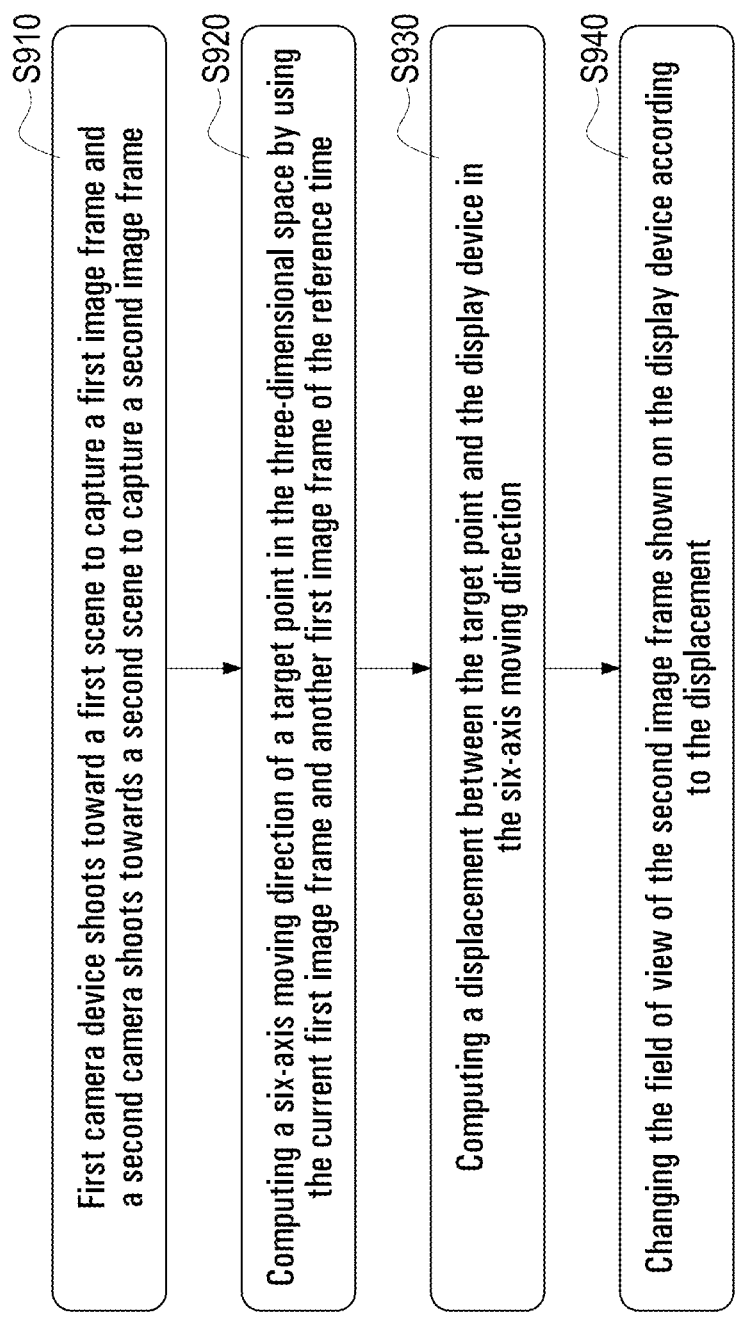

S910

First camera device shoots toward a first scene to capture a first image frame and a second camera shoots towards a second scene to capture a second image frame

S920

Computing a six-axis moving direction of a target point in the three-dimensional space by using the current first image frame and another first image frame of the reference time

S930

Computing a displacement between the target point and the display device in the six-axis moving direction

S940

Changing the field of view of the second image frame shown on the display device according to the displacement

Computing the parallel-plane displacement between the target point and the display device in the six-axis moving direction

S1020

Changing the field of view of the second image frame shown on the display device shows according to the first average of the parallel-plane displacement

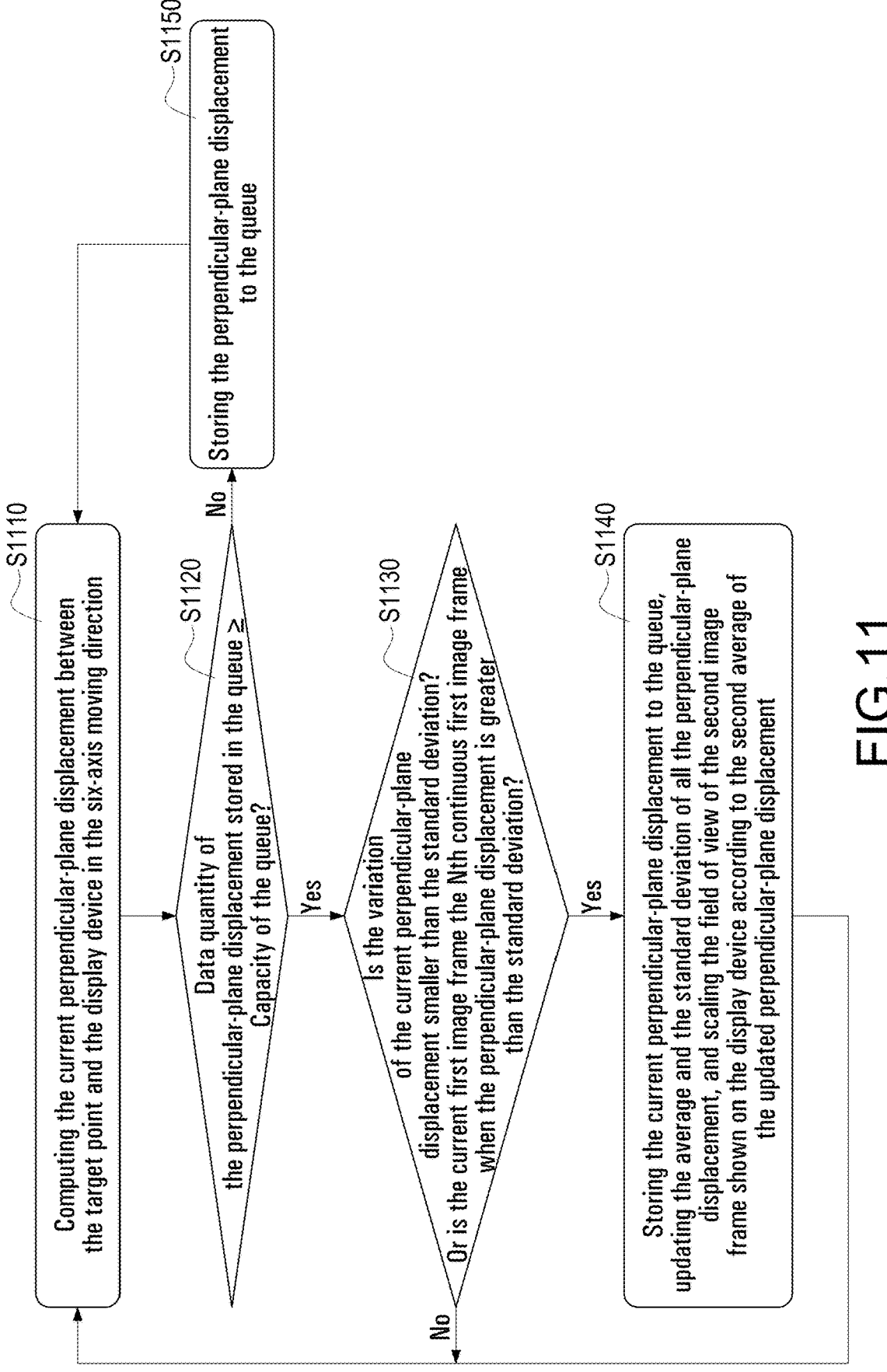

Computing the current perpendicular-plane displacement between the target point and the display device in the six-axis moving direction

S1120

Data quantity of the perpendicular-plane displacement stored in the queue ≥ Capacity of the queue?

No → S1150

Storing the perpendicular-plane displacement to the queue

Yes

S1130

Is the variation of the current perpendicular-plane displacement smaller than the standard deviation? Or is the current first image frame the Nth continuous first image frame when the perpendicular-plane displacement is greater than the standard deviation?

No

Yes → S1140

Storing the current perpendicular-plane displacement to the queue, updating the average and the standard deviation of all the perpendicular-plane displacement, and scaling the field of view of the second image frame shown on the display device according to the second average of the updated perpendicular-plane displacement

INDIRECT VISION SYSTEM, INDIRECT VISION DISPLAY METHOD, AND INTERACTIVE ELECTRONIC REARVIEW MIRROR SYSTEM FOR VEHICLES

BACKGROUND OF THE DISCLOSURE

Technical Field

The disclosure generally relates to a rearview system and a display method, particularly to an indirect vision display system, an indirect vision display method, and an indirect electronic rearview mirror system for vehicles.

Description of Related Art

In order to allow the driver to handle the traffic conditions around the vehicle, an indirect vision device is an essential piece of equipment for the vehicle. The indirect vision device can provide a view of the traffic around the vehicle, especially when the driver cannot directly retrieve the surrounding traffic information with their own eyes. In such situations, the indirect vision device plays an important role.

An indirect vision device is a device providing a clear view of the rear, sides, or front of the vehicle, such as devices integrated with traditional mirrors, cameras, or other devices that offer the driver indirect vision information about the vehicle. These devices are commonly referred to as the Exterior/Interior Monitoring System (CMS).

The capabilities of an indirect vision device are defined, for example, in the content of the R46/04 series of the United Nations Regulations (UN Regulations), which classifies vehicles into six categories, from Class I to Class VII, each with a corresponding field of view area. For instance, the indirect vision device of a Class I vehicle is required to provide the field of view as shown in FIG. 1.

In FIG. 1, when the driver is seated in the driver's seat, the driver's eye point 113 is located approximately 635 mm above the driver's seat and at the midpoint between the driver's eyes, where the two eyes are about 65 mm apart. The line connecting the two eyes passes through the center of the driver's seat designated by the vehicle manufacturer for the vehicle 111. The visible range for the driver in the vehicle 111 includes at least 60 meters behind the driver's eye point 113, and the field of view area 115 extends laterally at least 20 meters wide at this distance.

In existing technology, when a driver wants to know the surrounding traffic conditions of vehicle 111, they need to turn their head to check the left and right side mirrors, look up at the interior rearview mirror, or see the images provided by a camera installed at the rear of the vehicle. However, since the reflection in the interior rearview mirror is directed from the inside of the vehicle to the outside, the driver's view is still obstructed, and swaying their head does not improve the demanded field of view. Furthermore, the rear-camera device is mounted at a fixed place, so it can only provide a monotonic field of view, preventing the driver from freely viewing the desired angle. Therefore, how to provide the driver with a smooth and unobstructed view remains a challenge in this field.

SUMMARY OF THE INVENTION

According to an embodiment of the disclosure, an indirect vision system includes a first camera device, a second camera device, a display device, and a processor. The first camera device shoots toward a first scene to capture a first image frame. The second camera device shoots toward a second scene to capture a second image frame. The display device is connected to the second camera device and shows the second image frame. The processor is connected to the first camera device, the second camera device, and the display device, and performs operations of: computing a six-axis moving direction of a target point in a three-dimensional space by using a current first image frame and another of the first image frame of a reference time; computing a displacement between the target point and the display device in the six-axis moving direction; and changing a field of view of the second image frame shown on the display device according to the displacement.

According to an embodiment of the disclosure, the processor computes the displacement between the target point and the display device in the six-axis moving direction and further computes a parallel-plane displacement between the target point and the display device in the six-axis moving direction.

According to an embodiment of the disclosure, the processor computes the displacement between the target point and the display device in the six-axis moving direction and further computes a current perpendicular-plane displacement between the target point and the display device in the six-axis moving direction.

According to an embodiment of the disclosure, the processor changes the field of view of the second image frame shown on the display device according to the displacement and further changes the field of view of the second image frame shown on the display device according to a first average of the parallel-plane displacements.

According to an embodiment of the disclosure, the processor changes the field of view of the second image frame shown on the display device according to the displacement, further stores the current perpendicular-plane displacement to the queue, and updates the standard deviation when a variation of the current perpendicular-plane displacement is smaller than the standard deviation of all the perpendicular-plane displacements stored in a queue or the current first image frame is a continuous Nth image frame when the perpendicular-plane displacement is greater than the standard deviation, where N is a positive integer, and scales the field of view of the second image frame according to a second average of all the perpendicular-plane displacements of the queues.

According to an embodiment of the disclosure, the processor changes the field of view of the second image frame shown on the display device according to the first average of the parallel-plane displacement and further controls the display device to change the field of view of the second image frame toward a second direction shown on the display device when the target point moves in a first direction, where the first direction and the second direction are opposite directions, and the first direction and the second direction are both upward-and-downward direction or left-and-right direction.

According to an embodiment of the disclosure, after computing the perpendicular-plane displacement, the processor stores the current perpendicular-plane displacement to the queue if determines a quantity of the perpendicular-plane displacement stored in the queue is smaller than a capacity of the queue.

According to an embodiment of the disclosure, after storing the current perpendicular-plane displacement to the queue and updating the standard deviation, the processor updates the second average of all the perpendicular-plane displacements of the queue and updates a scaling rate by using the second average, where the scaling rate is used to zoom in or zoom out the field of view of the second image frame shown on the display device.

According to an embodiment of the disclosure, when the target point moves toward the display device with a direction perpendicular to the display device, the processor controls the display device to scale up the field of view of the second image frame shown on the display device; when the target point moves backward related to the display device with the direction perpendicular to the display device, the processor controls the display device to scale down the field of view of the second image frame shown on the display device.

According to an embodiment of the disclosure, when the target point is not detected in the current first image frame, the processor controls the display device to show the second image frame with a default field of view.

According to an embodiment of the disclosure, an interactive electronic rearview mirror system for vehicles includes a driver-camera device, a rear-camera device, and an electronic rearview mirror. The driver-camera device is arranged on a front side of the vehicle and interior of the vehicle and shoots toward a driver seat to capture a first image frame. The rear-camera device is arranged on a rear side or outer side of the vehicle (including the left or right side mirror) and shoots toward a scene behind the vehicle or outside the vehicle (including the scene of the left or right side of the vehicle) to capture a second image frame. The electronic rearview mirror is arranged on the front side and interior of the vehicle, connected to the driver-camera device and the rear-camera device, and shows the second image frame toward the driver seat. The driver-camera device performs operations of: computing a six-axis moving direction of a driver eye-point position in a three-dimensional space by using a current first image frame and another of the first image frame of a reference time; computing an upward-and-downward displacement and a left-and-right displacement of the driver eye-point position in the six-axis moving direction; computing a current perpendicular-plane displacement between the driver eye-point position and the electronic rearview mirror in the six-axis moving direction; when a variation of the current perpendicular-plane displacement is smaller than a standard deviation of all the perpendicular-plane displacements of a queue or the current first image frame is the Nth continuous image frame when the perpendicular-plane displacement is greater than the standard deviation, storing the current perpendicular-plane displacement to the queue and updating the standard deviation, where N is a positive integer; and changing the field of view of the second image frame shown on the electronic rearview mirror with upward-and-downward or left-and-right according to a first average of the upward-and-downward displacement or the left-and-right displacement, and scaling the field of view of the second image frame shown on the electronic rearview mirror according to a second average of all the perpendicular-plane displacements of the queue.

The disclosure provides an indirect vision system, an indirect vision display method, and an interactive electronic rearview mirror, exploiting the simulated optical imaging principle to ameliorate the conventional rearview mirror without changing the driver's experience, providing the driver to see the display device or the electronic rearview mirror with any sitting position while the driver sits on the driver's seat to retrieve the demanded view area and providing the effect of correlation between the driver and the display screen.

BRIEF DESCRIPTION OF THE DRAWINGS

FIG. 2 illustrates the six-axis moving direction of the indirect vision system and the scene behind the vehicle.

FIG. 9 is a flowchart of the indirect vision display method according to one embodiment of the present disclosure.

FIG. 11 is a flowchart of stabilizing the display screen under the perpendicular-plane control of the indirect vision display method according to one embodiment of the present disclosure.

DETAILED DESCRIPTION

Figure 1:
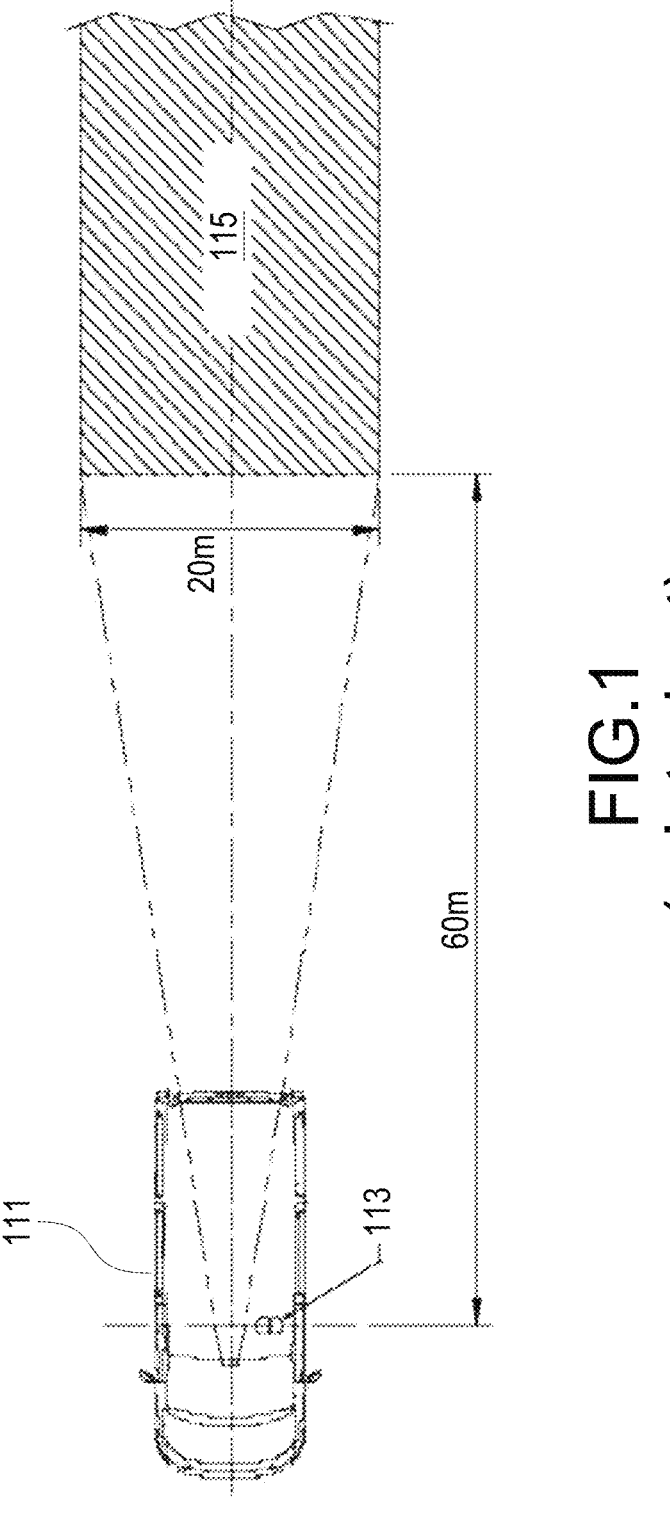
FIG. 1 illustrates the region of the indirect vision for the vehicle drivers.

Reference will now be made in detail to the present embodiments of the disclosure, examples of which are illustrated in the accompanying drawings. The same reference numbers are used in the drawings and the description wherever possible to refer to the same or like parts.

FIG. 2 illustrates the six-axis moving direction of the indirect vision system and the scene behind the vehicle.

As shown in FIG. 2, the six-axis direction takes an electronic rearview mirror 215 as the reference base of the coordinate system, which has the X-axis, the Y-axis, and the Z-axis. The X-axis direction is the direction that the driver 217 moves left and right (such as the moving horizontal-like direction) relative to the electronic rearview mirror 215, the Y-axis direction is the direction that the driver 217 moves forward and backward relative to the electronic rearview mirror 215, and the Z-axis direction is the direction that the driver 217 moves upward and downward relative to the electronic rearview mirror 215.

In the disclosure, the plane formed by the X-axis and the Z-axis is parallel with the electronic rearview mirror 215, which is called a "parallel plane"; the displacement that the driver moves in the X-axis direction or the Z-axis direction is called "parallel-plane displacement". The Y-axis direction is perpendicular to the electronic rearview mirror 215, which is called a "perpendicular plane"; the displacement that the driver moves in the Y-axis direction is called "perpendicular-plane displacement".

An interior-vehicle camera 211 is disposed in the interior of the vehicle 211, such as the windshield, and the shooting angle of the interior vehicle camera 213 is toward the driver's face. The electronic rearview mirror 215 is arranged in the interior of the vehicle 211, such as the windshield or the vehicle headlining. The driver 217 may watch the electronic rearview mirror 215 to understand the situation behind and around the vehicle 211. The rear-camera device 219 is disposed at the rear of the vehicle 211 (it is not limited to inside or outside the vehicle 211), and the rear-camera device 219 is exploited to capture images covering the rear-camera view 231, such as the images covering the scenes outside the vehicle 233, 235, and 237.

In one embodiment, the images of the rear-camera view 231 captured by the rear-camera device 219 are provided to the electronic rearview mirror 215 for displaying. The driver 217 may watch the display screen of the electronic rearview mirror 215 to get a handle on the situation behind the vehicle and the around environment.

The interior vehicle camera 213 may be the depth camera, the time-of-flight camera (ToF), or the camera device that obtains the relative distance and position information of the driver 217.

The indirect vision system provided in the disclosure may move along with the driver 217 (such as the head moving forward and backward, left and right, and upward and downward), so the electronic rearview mirror 215 may display the image information that is useful for the driver 217 or the driver 217 expects to sec.

Figure 3:
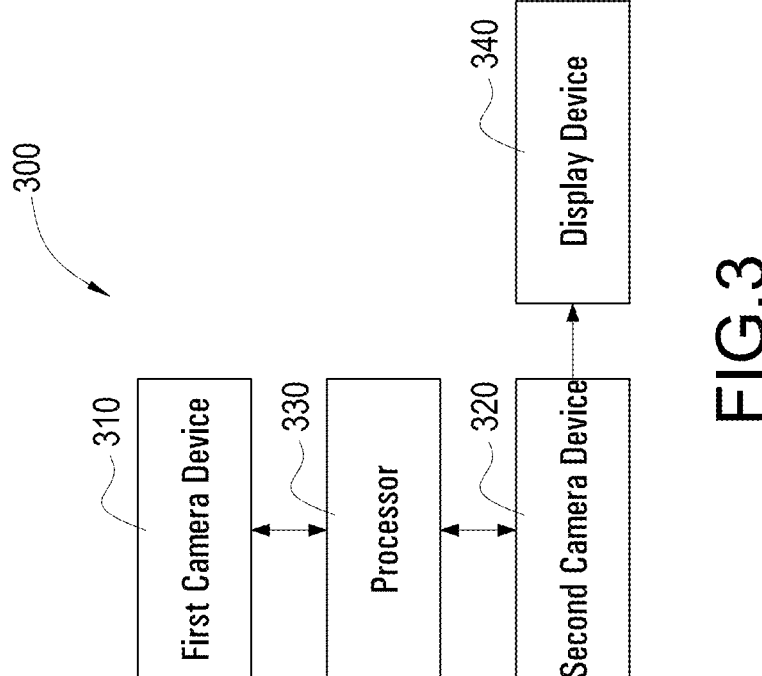
FIG. 3 is a circuit block diagram of the indirect vision system according to one embodiment of the present disclosure.

FIG. 3 is a circuit block diagram of the indirect vision system according to one embodiment of the present disclosure.

The indirect vision system 300 includes a first camera device 310, a second camera device 320, a processor 330, and a display device 340.

The first camera device 310 is arranged to shoot toward a first scene to capture a first image frame. The first camera device 310 may be arranged in the vehicle with the camera angle toward the driver to capture images. In the embodiment, the first image frame (or called a "first scene") covers the image of the driver's face, head, upper body, or waving hand.

The second camera device 320 is arranged to shoot toward a second scene to capture a second image frame. The second camera device 320 is arranged in the rear of the vehicle, which may be inside or outside the vehicle, with the camera angle toward the driveways or the visual range behind the vehicle to capture the images of the scenes. In the embodiment, the second image frame is the image (or called a "second scene") covering all the driveways behind the vehicle.

In another embodiment, the second camera device 320 may be arranged at the left side or right side of the vehicle, and shoot toward an angle of the left or right side of the vehicle, such that the second scene covers the left side or right side of the vehicle.

To breviate the content, the second camera device 320 that is arranged at the vehicle rear is taken as an example, though the position to arrange the second camera device 320 is not limited to the vehicle rear.

The display device 340 is connected to the second camera device 320 and displays the second image frame. The display device 340 may be arranged inside the vehicle to provide the driver to see the image of the second scene.

The processor 330 is connected to the first camera device 310 and the second camera device 320. In another embodiment, the processor 330 may be the processing chip of the first camera device 310, or the electronic control unit (on-board computer).

The processor 330 computes the six-axis moving direction of the target point in the three-dimensional space by using a current first image frame and another first image frame of a reference time, compute a displacement between the target point and the display device 340 in the six-axis moving direction, and change a field of view of the second image frame shown on the display device 340 according to the displacement.

The reference time may be, but not limited to, 66 ms. For example, the first camera device 310 captures one of the first image frames every 66 ms. The first camera device 310 captures the current first image frame at 0 ms and captures another first image frame at 65th ms. It should be noted that the reference time is not limited to 66 ms in the disclosure.

The six-axis moving direction may be left-right moving direction, forward-backward moving direction, and upward-downward moving direction shown in FIG. 2.

The target point (or called an "eye-point position") may be the midpoint position of the two eyes of the driver. In the embodiment, the processor 330 exploits the current first image frame and the another first image frame of the reference time to compute the six-axis moving direction of the eye-point position of the driver in the three-dimensional space.

In one embodiment, the processor 330 or the first camera device 310 may perform an artificial intelligence algorithm to recognize and detect the position of the target point of the first image frame relative to the display device 340.

The processor 330 computes a parallel-plane displacement between the target point and the display device 340 in the six-axis moving direction by using two of the first image frames. The parallel-plane displacement may be the displacement of the target point moving in the X-axis or Z-axis direction (FIG. 2). The processor 330 then changes the field of view of the second image frame shown on the display device 340 according to the obtained parallel-plane displacement. For example, the processor 330 computes the parallel-plane displacement of the target point by using the current first image frame and the another first image frame, and then computes another parallel-plane displacement of the target point by using the another first image frame and further the next first image frame. By performing the processes, the processor 330 computes multiple parallel-plane displacements. The processor 330 then computes a first average of the multiple parallel-plane displacements and changes the field of view of the second image frame shown on the display device 340 according to the first average.

In this embodiment, when the target point moves in a first direction, the processor 330 controls the display device 340 to change the field of view showing the second image frame toward a second direction, where the first direction is opposite to the second direction, and the first direction and the second direction are the upward-downward displacement direction or the left-right displacement direction. For example, when the target point moves upward relative to the display device 340, the field of view of the second image frame shown on the display device 340 moves downward; when the target point moves downward relative to the display device 340, the field of view of the second image frame shown on the display device 340 moves upward; when the target point moves left relative to the display device 340, the field of view of the second image frame shown on the display device 340 moves right; when the target point moves right relative to the display device 340, the field of view of the second image frame shown on the display device 340 moves left.

On the other hand, the processor 330 computes a perpen-dicular-plane displacement between the target point and the display device 340 in the six-axis moving direction by using two first image frames. The perpendicular-plane displace-ment may be the displacement of the target point moving in the Y-axis direction (FIG. 2). The processor 330 then changes the field of view of the second image frame shown on the display device 340 according to the obtained perpen-dicular-plane displacement.

Specifically, the processor 330 computes the current per-pendicular-plane displacement by using the current first image frame and another first image frame. The processor 330 determines whether the variety of the current perpen-dicular-plane displacement is smaller than the standard deviation of all the perpendicular-plane displacement stored in a queue, or determines whether the current first image frame is the Nth continuous image frame when the perpen-dicular-plane displacement is greater than the standard deviation, where the queue may be stored in the memory (not shown in figures) of the processor 330 or the first camera device 310. The queue stores multiple perpendicu-lar-plane displacements, such as 10.

In one embodiment, when determining that the variety of the current perpendicular-plane displacement is smaller than the standard deviation of all the perpendicular-plane dis-placements stored in the queue, the processor 330 stores the current perpendicular-plane displacement to the queue to update the data of the queue, and computes the standard deviation of the updated data of the queue to be the updated standard deviation.

In another embodiment, when determining that the cur-rent first image frame is the Nth continuous image frame when the perpendicular-plane displacement is greater than the standard deviation, the processor 330 stores the current perpendicular-plane displacement to the queue to update the data of the queue, and updates the standard deviation by using the updated data of the queue to update the standard deviation, where N is a positive integer. The N value may be 5. In the embodiment, the 5 continuous image frames are captured when the perpendicular-plane displacements are all greater than the standard deviation.

After updating the data of the queue, the processor 330 computes a second average of all the perpendicular-plane displacement and scales the field of view of the second image frame shown on the display device 340 by using the second average.

In one embodiment, when the target point (such as the eye point of the driver) moves forward along the direction perpendicular to the display device 340, the processor 330 controls the display device 340 to zoom in the field of view of the second image frame shown on the display device 340. On the contrary, when the target point moves backward along the direction perpendicular to the display device 340, the processor 330 controls the display device 340 to zoom out the field of view of the second image frame shown on the display device 340.

Specifically, the processor 330 computes the average (or called the "second average") of all the perpendicular-plane displacement stored in the queue. The processor 330 then updates a scaling rate by the second average which the scaling rate is used to zoom in or zoom out the field of view of the second image frame shown on the display device 340. For example, if the second average is smaller than the one before being updated, it indicates that the eye point of the driver becomes close to the display device 340, the proces-sor 330 zooms in the field of view of the second image frame shown on the display device 340 by using the second average. At this time, the field of view of the second image frame shown on the display device 340, that is, the people or objects displayed on the screen can be seen in detail because the image of the people or objects appears larger. On the contrary, if the second average is greater than or equal to the second average before being updated, it indicates that the eye point of the driver becomes distant from the display device 340, and the processor 330 zooms out the field of view of the second image frame shown on the display device 340 by using the second average. At this time, the field of view of the second image frame shown on the display device 340, that is, the people or the objects displayed on the screen is reduced so the second image frame shows the larger area of the environment.

In one embodiment, after computing the perpendicular-plane displacement between the target point and the display device 340, the processor 330 checks the quantity of the perpendicular-plane displacement stored in the queue. If the quantity of the perpendicular-plane displacement stored in the queue is less than the capacity of the queue, the processor 330 directly stores the current perpendicular-plane displace-ment to the queue (such as First-In-First-Out (FIFO)). The processor 330 then does not perform any operations or judgment to the perpendicular-plane displacement. Instead, the processor 330 goes back to the operation of computing the perpendicular-plane displacement between the target point of the first image frame and the display device 340.

On the other hand, the processor 330 detects whether the driver sits in the driver's seat. If the target point is not detected in the current first image frame, it indicates that no one sits in the driver's seat, the processor 330 controls the display device 340 to show the second image frame with the default field of view, that is, the display device 340 is reset to the default field of view to show the image whose field of view is not adjusted at the initial state.

In one embodiment, if the frame per second (FPS) of the first camera device 310 is less than a default value (such as 20 FPS), the processor 330 turns off the function of scaling the field of view of the second image frame.

Therefore, the indirect vision system of the present dis-closure may relocate the field of view that the driver needs corresponding to the eye point of the driver, the average-and-stable mechanism may provide smoother relocation of the field of view for the driver to see, and the dramatic change of the image screen may be prevented, so the driver's safety is improved.

Figure 4:
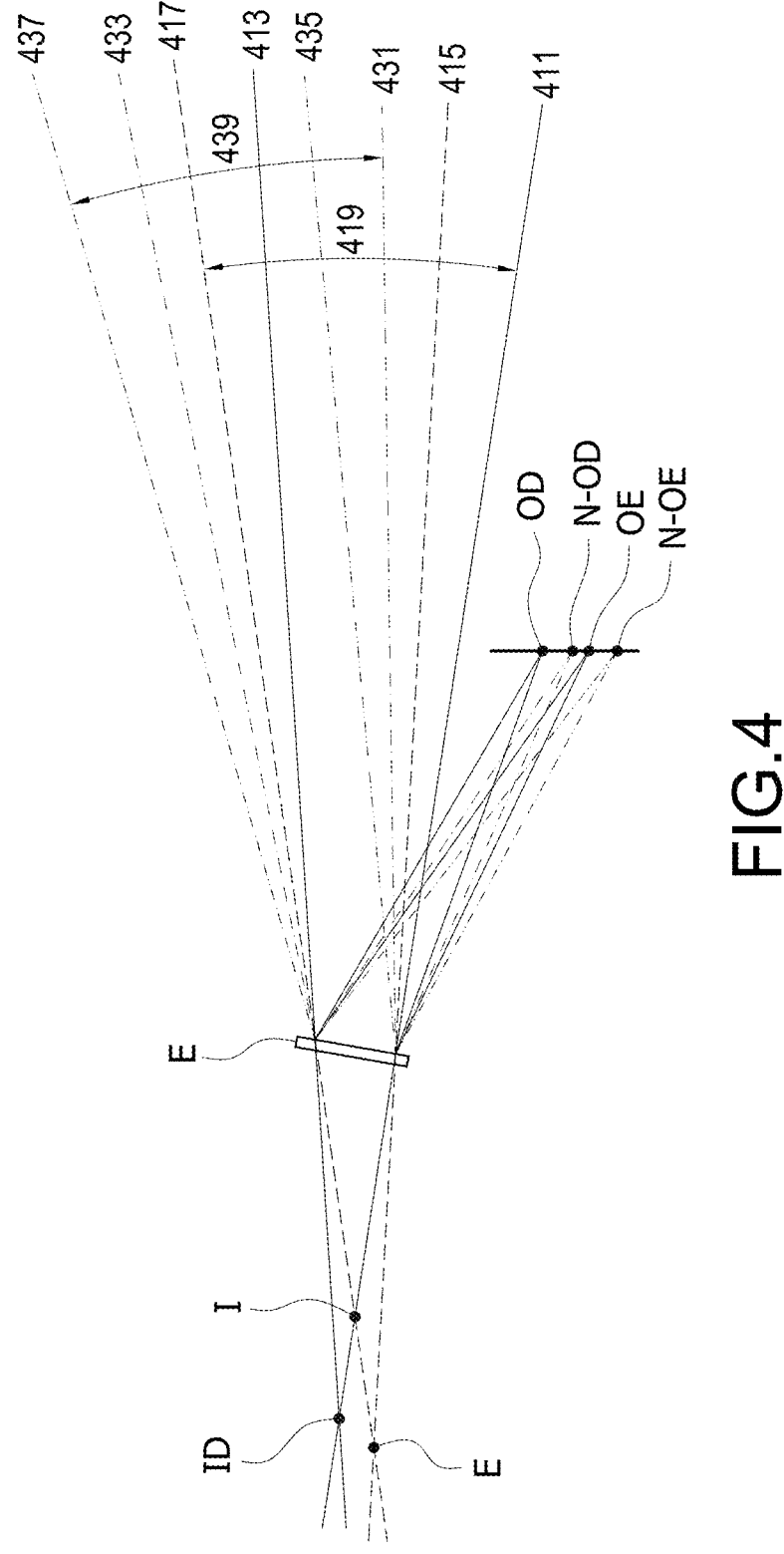
FIG. 4 is the eye-point position of the driver before and after the driver sways the head and the optical path.

For the sake of understanding the disclosure, a further description is provided in FIG. 4. FIG. 4 is the eye-point position of the driver before and after the driver sways the head and the optical path.

In the scenario, the driver sits in the driver's seat (not shown in the figure) and watches the display device E (such as the electronic rearview mirror). In time T, the driver's eyes, respectively corresponding to the right-eye position OD and the left-eye position OE, see the display device E. In the situation of simulating the optical path, the right eye sees a right-eye virtual image ID and the left eye sees a left-eye virtual image IE. At this time, two eyes see the two-eye virtual image I covering the view of the two eyes. On the other hand, based on the optical imaging principle, the right eye position OD sees a right-eye far-left view 411 through the far left of the display device E and sees a right-eye far-right view 413; the left eye position OE sees a left-eye far-left view 415 and sees a left-eye far-right view 417 through the far right of the display device E. At this time, the driver's eyes have a binocular vision 419 covering the view between the right-eye far-left view 411 and the left-eye far-right view 417.

On the other hand, in time T+1, the driver's head sways left. At this time, the driver's eye position moves to a right-eye position N-OD and a left-eye position N-OE. After moving to the new eye position, based on the simulated optical path of the optical imaging principle, the driver may see at the right-eye position N-OD a right-eye far-left view 431 through the far left of the display device E and a right-eye far-right view 433 through the far right of the display device E; the driver may see at the left-eye position N-OE a left-eye far-left view 435 through the far left of the display device E and a left-eye far-right view 437 though the far right of the display device E. At this time, the driver's eyes have a binocular vision 439 covering the view between the right-eye far-left view 431 and the left-eye far-right view 437.

Figure 5:
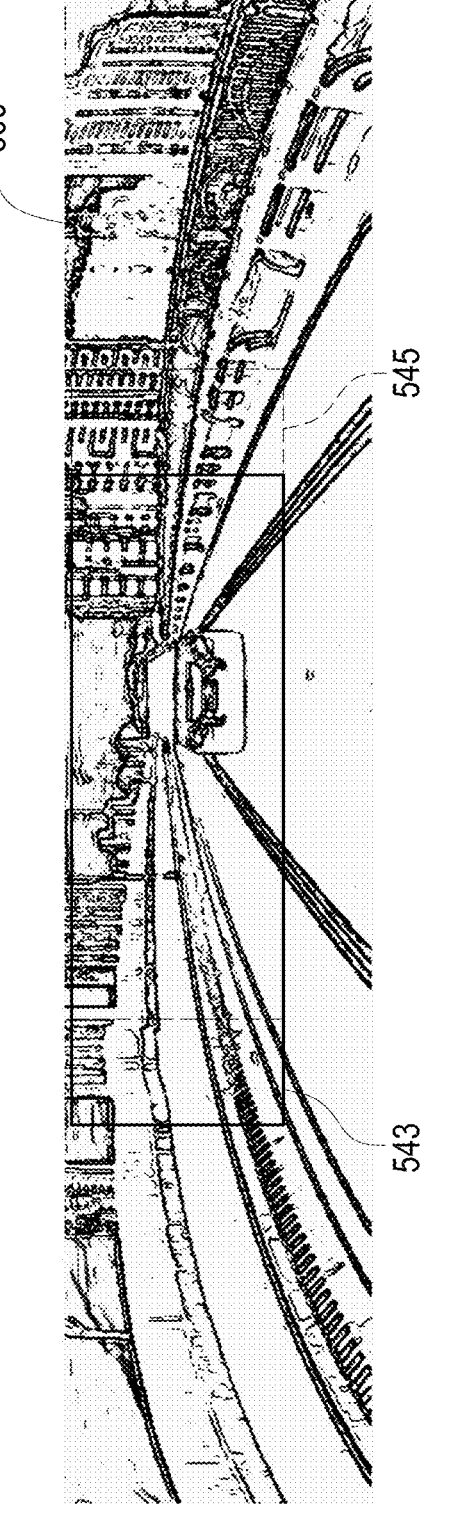
FIG. 5 illustrates the image with the field of view before and after the driver sways the head of FIG. 4 according to one embodiment of the present disclosure.

FIG. 5 illustrates the image with the field of view before and after the driver sways the head of FIG. 4 according to one embodiment of the present disclosure.

The image 500 shown in FIG. 5 may be the image captured by the second camera device 320 of FIG. 3 and is partially or entirely shown by the display device 340 of FIG. 3 corresponding to the movement of the driver's head.

Following the embodiment of FIG. 4, in time T, the image shown by the display device 340 is an image frame 543 (solid line). In time T+1, because the driver's head moves left (with the eyesight generally remaining forward), the field of view of the display device 340 moves right correspondingly, that is, the image shown on the display device 340 is illustrated as an image frame 545 (dashed line). In other words, the driver moves the head to see the expected view around the vehicle on the display device 340. Similarly, if the driver's head moves right, the field of view of the display device 340 moves left correspondingly; if the driver's head moves upward, the field of view of the display device 340 moves downward correspondingly; if the driver's head moves downward, the field of view of the display device 340 moves upward correspondingly. To simplify the content, similar image frames are not illustrated.

Figure 6:
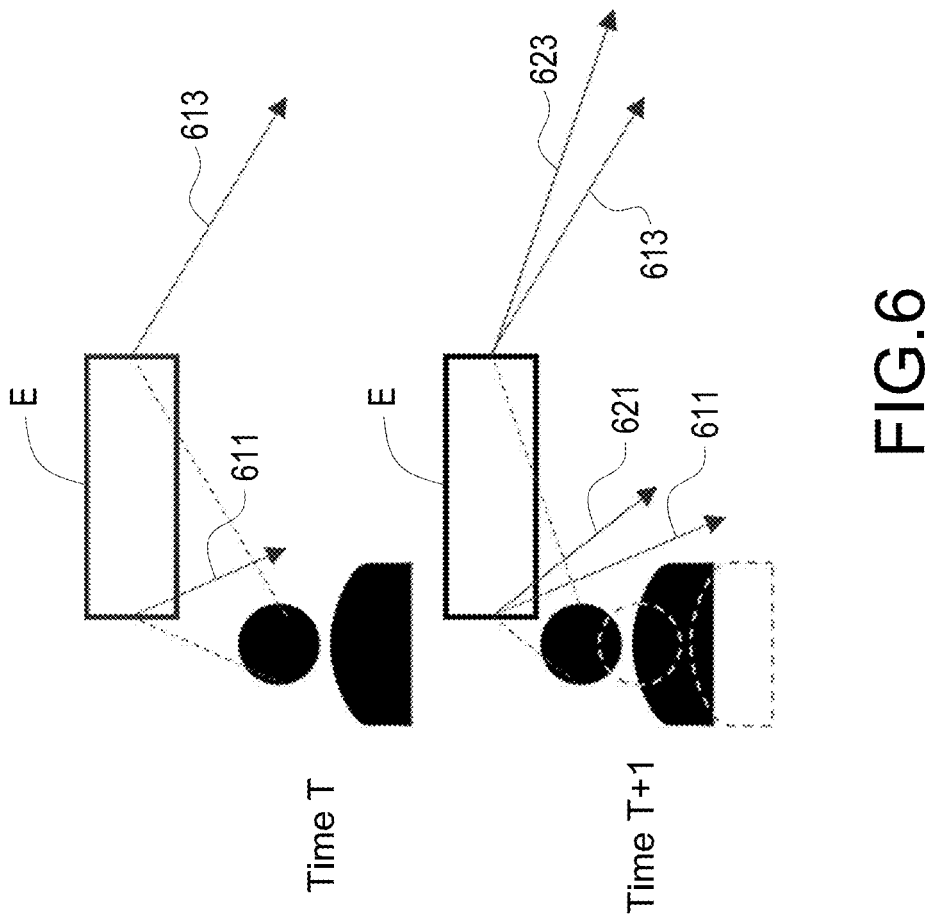
FIG. 6 illustrates the optical reflection related to the perpendicular-plane control according to one embodiment of the present disclosure.

FIG. 6 illustrates the optical reflection related to the perpendicular-plane control according to one embodiment of the present disclosure.

Compared with the embodiments of FIG. 4 and FIG. 5 the driver's head moves up and down and left and right, FIG. 6 shows the embodiment of the driver's head moving backward and forward. As shown in FIG. 6, in time T, the driver sees the display device E (such as the rearview mirror), and the left and right sides of the optical path of two eyes correspond to an optical path 611 and an optical path 613 based on the simulated optical path. In time T+1, when the driver's body moves forward (such as far away from the seatback of the driver's seat), the head also moves forward correspondingly. At this time, the left and right sides of the optical path of two eyes correspond to an optical path 621 and an optical path 623 based on the simulated optical path. In FIG. 6, it is obvious that the field of view of the driver becomes the further right side of the environment.

Figure 7:
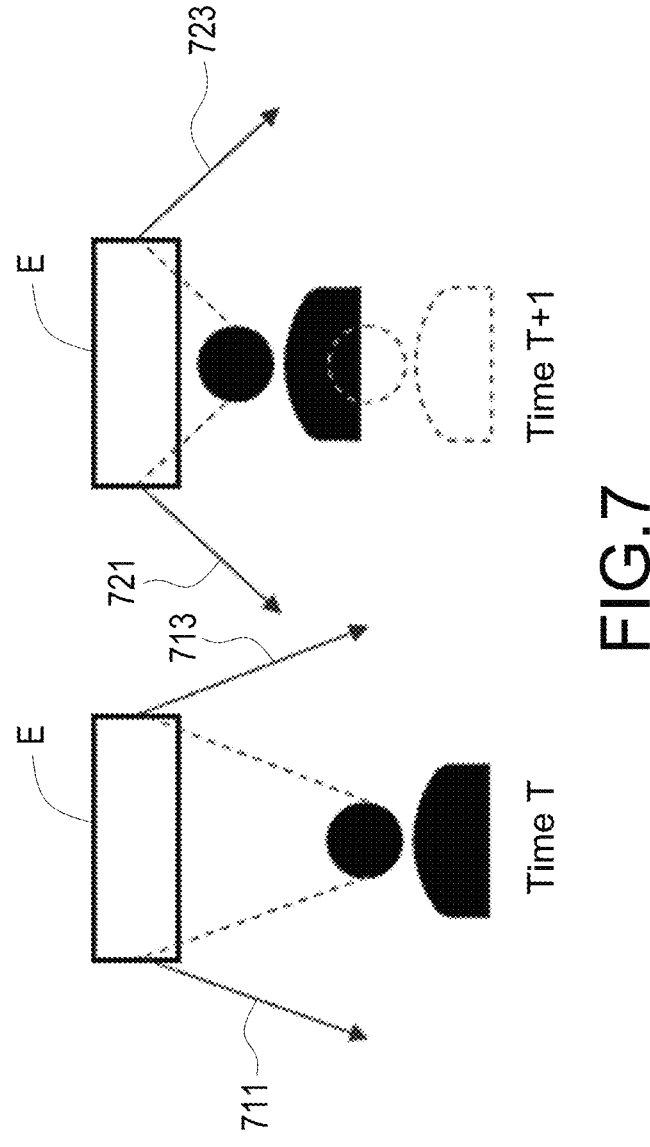
FIG. 7 illustrates the varieties of the field of view related to the perpendicular-plane control according to one embodiment of the present disclosure.

FIG. 7 illustrates the varieties of the field of view related to the perpendicular-plane control according to one embodiment of the present disclosure.

Compared with FIG. 6 that the driver's position is in front of one side of the display device E, FIG. 7 shows the driver is in front of the middle of the display device E. As shown in FIG. 7, in time T, the driver sees the display device E (such as the rearview mirror), and the left and right sides of the optical path of two eyes correspond to an optical path 711 and an optical path 713 based on the simulated optical path. In time T+1, when the driver's body moves forward (such as far away from the seatback of the driver's seat), the head also moves forward correspondingly. At this time, the left and right sides of the optical path of two eyes correspond to an optical path 721 and an optical path 723 based on the simulated optical path. As shown in FIG. 7, because the driver's head moves forward and at the position in front of the middle of the display device E, the field of view of the driver becomes the further left and right side of the environment, and the driver may see the more expanded angle of the environment in the image.

Figures 8A, 8B:
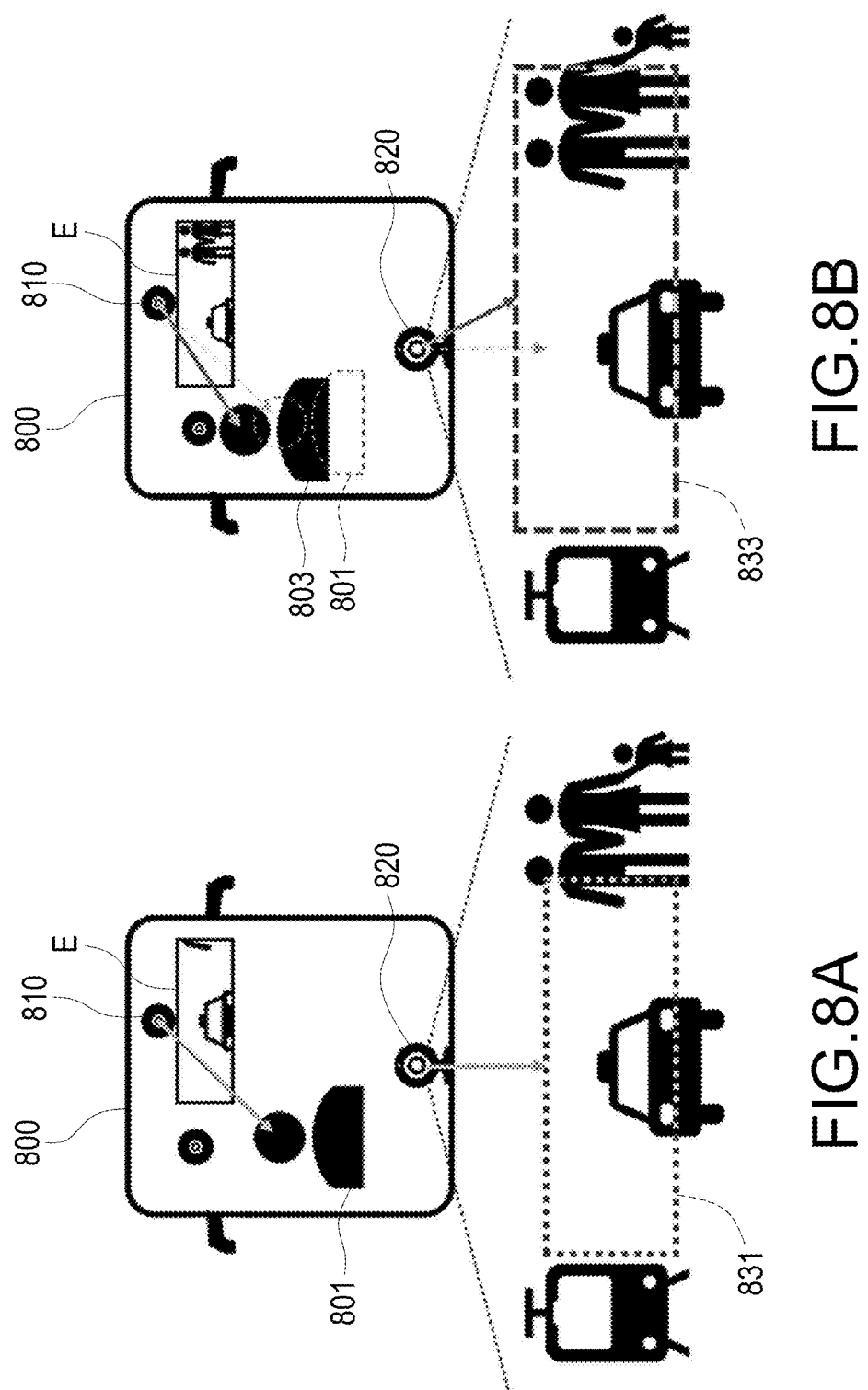
FIG. 8A and FIG. 8B illustrate the display screen related to the perpendicular-plane control according to one embodiment of the present disclosure.

For the sake of understanding the operations of FIG. 6 and FIG. 7, the reference is made to FIG. 8A and FIG. 8B. FIG. 8A and FIG. 8B illustrate the display screen related to the perpendicular-plane control according to one embodiment of the present disclosure.

As shown in FIG. 8A and FIG. 8B, the driver sits in the vehicle 800, and the display device E is arranged at the position (such as the windshield) where the driver can see. In the embodiment, the first camera device 810 is mounted at the top of the display device E and shoots toward the driver's seat, and the second camera device 820 is mounted at the rear of the vehicle 800 and captures the view of the road ahead. The first camera device 810 may be the first camera device 310 provided in FIG. 3, and the second camera device 820 may be the second camera device 320 provided in FIG. 3.

In FIG. 8A, the first camera device 810 captures the image of the driver at position 801 in time T. The indirect vision system computes the displacement of the driver's head related to the display device E and controls the display device E to display the image captured by the second camera device 820. At this time, the driver sees the image 831 on the display device E. In time T+1, the indirect vision system determines that the driver moves from the position 801 to the position 803, that is, the driver moves toward the display device E (perpendicular displacement). At this time, the driver sees the image 833 on the display device E. Because the driver moves toward the display device E, compared to the image 831, the driver may see the view of the further right side of the scene behind the vehicle 800 by the image 833.

FIG. 9 is a flowchart of the indirect vision display method according to one embodiment of the present disclosure.

Each step of the indirect vision display method of FIG. 9 may be performed by the indirect vision system 300 of FIG. 3.

In step S910, the first camera device 310 shoots toward the first scene to capture the first image frame, and the second camera device 320 shoots toward the second scene to capture the second image frame.

In step S920, the processor 330 computes the six-axis moving direction of the target point in the three-dimensional space by using the current first image frame and the another first image frame of the reference time.

In step S930, the processor 330 computes the displacement between the target point and the display device in the six-axis moving direction.

In step S940, the processor 330 changes the field of view of the second image frame shown on the display device according to the displacement.

The disclosure provides the indirect vision system 300 and the indirect vision display method that provides the images around the environment the driver expects to see according to the movement of the driver, to solve the problem that traditional camera devices can only provide a fixed field of view such that the angle of the display device is not changeable no matter how the driver moves the angle relative to the display device.

In the disclosure, the indirect vision system 300 and the indirect vision display method provide the images, related to the movement of the driver, around the environment that the driver expects to see, furthermore, the images provided by the indirect vision system 300 and the indirect vision display method may be stabilized, so the images are displayed smoothly.

Figure 10:
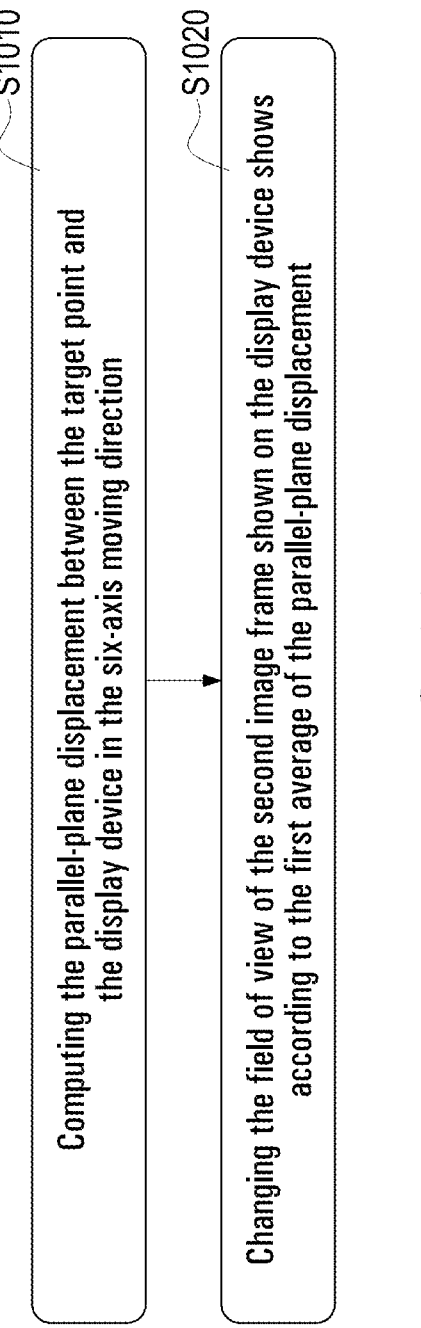
FIG. 10 is a flowchart of stabilizing the display screen under the parallel-plane control of the indirect vision display method according to one embodiment of the present disclosure.

FIG. 10 is a flowchart of stabilizing the display screen under the parallel-plane control of the indirect vision display method according to one embodiment of the present disclosure.

Each step of the indirect vision display method of FIG. 10 may be performed by the indirect vision system 300 of FIG. 3.

In processes of the parallel-plane control (such as the direction of upward and downward or the left and right, or the X-axis and the Z-axis direction of FIG. 2), if the processor 330 directly controls the view angle of the images by the displacement of the driver's movement, the driver may feel uncomfortable in viewing the display screen. Hence, the disclosure further provides the process of stabilizing the display screen under the parallel-plane control.

In step S1010, the processor 330 computes the parallel-plane displacement between the target point and the display device 340 in the six-axis moving direction.

Because the driver's spine and hips support the body, in the situation that the body moves normally, the movement of the head in the space includes the displacement in the six-axis moving direction. When the eye-point position (the midpoint position of the eyes) of the driver is taken as the target point, the processor 330 respectively computes the displacement in the X-axis direction between the target point and the display device 340 and the displacement in the Z-axis direction between the target point and the display device 340.

In step S1020, the processor 330 changes the field of view of the second image frame shown on the display device 340 according to the first average of the parallel-plane displacement.

In one embodiment, the processor 330 takes two of the latest image frames to compute the displacements of the X-axis direction and the Z-axis direction and calculates the average of the displacement of the X-axis direction and/or the average of the displacement of the Z-axis (the average of the displacement of the X-axis and the average of the displacement of the Z-axis are called the "first average"). The first average is applied to change the field of view of the second image frame shown on the display device 340, that is, the field of view of the environment behind the vehicle.

FIG. 11 is a flowchart of stabilizing the display screen under the perpendicular-plane control of the indirect vision display method according to one embodiment of the present disclosure.

Each step of FIG. 11 may be performed by the indirect vision system 300 of FIG. 3.

In the process of the perpendicular-plane control (such as the forward and backward direction or the Y-axis direction of FIG. 2), if the processor 330 moves the field of view of the display screen directly using the displacement of the driver moving forward and backward, it leads to an uncomfortable viewing experience to the driver. Stabilizing the display screen under the perpendicular-plane control is provided as follows.

In step S1110, the processor 330 computes a current perpendicular-plane displacement between the target point and the display device in the six-axis moving direction.

In one embodiment, when the eye-point position (the midpoint position of the eyes) of the driver is taken as the target point, the processor 330 computes the displacement between the target point and the display device 340 in the Y-axis direction, that is, the perpendicular-plane displacement.

In step S1120, the processor 330 determines whether a data quantity of the perpendicular-plane displacement stored in the queue is greater than or equal to the capacity of the queue.

The queue is used to store multiple perpendicular-plane displacements. The queue may be the memory of the processor 330 or the memory of the first camera device 310. The indirect vision system 300 may set the queue to a default capacity as the maximum capacity for storing the data of the perpendicular-plane displacement.

In step S1120, if the data quantity of the perpendicular-plane displacement stored in the queue is smaller than the capacity of the queue, it indicates that the data quantity of the first image frame is slightly small since the current time, in the embodiment, there is no need to perform the process of stabilizing the display screen control at the time point and then the process goes to step S1150; otherwise, the process goes to step S1130.

In step S1130, the processor 330 determines whether a variation of the current perpendicular-plane displacement is smaller than the standard deviation or whether the current first image frame is the continuous Nth first image frame when the perpendicular-plane displacement is greater than the standard deviation.

After a period of time, the first camera device 310 captures the multiple first image frames, and the processor 330 computes the multiple perpendicular-plane displacements by using the multiple first image frames and computes the standard deviation of all the perpendicular-plane displacements stored in the queue.

In step S1130, the processor 330 compares the current perpendicular-plane displacement with the standard deviation to assess the variation of the current perpendicular-plane displacement. If the current perpendicular-plane displacement is smaller than the standard deviation, it indicates that the perpendicular-plane displacement of the driver belongs to normal driving and the driver concentrates on driving (i.e., there is no situation like sudden breaks or chatting with others with head swaying), the process goes to step S1140.

On the other hand, in step S1130, the processor 330 determines that the perpendicular-plane displacement by engaging in the current first image frame is greater than the standard deviation, and further determines that the current first image frame is the continuous Nth first image frame when the perpendicular-plane displacement is greater than the standard deviation, it indicates that the driver is disturbed from concentration condition, so the process goes to step S1140. In the embodiment, N is a positive integer, such as 5.

It should be noted that step S1130 refers to alternative options, so the processor 330 proceeds to step S1140 when determining that at least one of the conditions satisfies the requirement. Otherwise, the process goes back to step S1110 to continuously monitor the movement of the driver's head.

On the other hand, the time condition may substitute for the continuous Nth first image frames used by the processor 330. For example, the determination condition may be the continuous 5th first image frame, or the determination condition used by the processor 330 may be 0.25 seconds and the series of the first image frame may be then calculated by the frames per second (according to the specification of the camera device) of the camera device.

In step S1140, the processor 330 stores the current perpendicular-plane displacement to the queue to update the data of the queue, updates the second average and the standard deviation of all the perpendicular-plane displacements, and scales the field of view of the second image frame shown on the display device according to the second average of the updated perpendicular-plane displacement.

The processor 330 updates the perpendicular-plane displacement computed by the current first image frame to the queue, such as the first-in-first-out (FIFO) order, and calculates the average and the standard deviation by engaging the perpendicular-plane displacement to obtain the updated average and the standard deviation as the basis for the next determination. In addition, the processor 330 uses the average of the updated perpendicular-plane displacement to scale the field of view of the second image frame shown on the display device.

As described in step S1120 above, if the data quantity of the queue is not enough, the process goes to step S1150, that is, the processor 330 stores the perpendicular-plane displacement to the queue and goes back to step S1110 to continuously monitor the movement of the driver's head.

In the disclosure, the first average of the multiple parallel-plane displacements is calculated to stabilize the field of view of the second image frame shown on the display device 340 when changing the field of view, so the driver will not feel dramatically flickering. In addition, the second average of the multiple perpendicular-plane displacements is calculated and used to correspondingly scale up or scale down the field of view of the display device 340 to achieve the stabilization effect as the field of view is changed smoothly.

Figure 12:
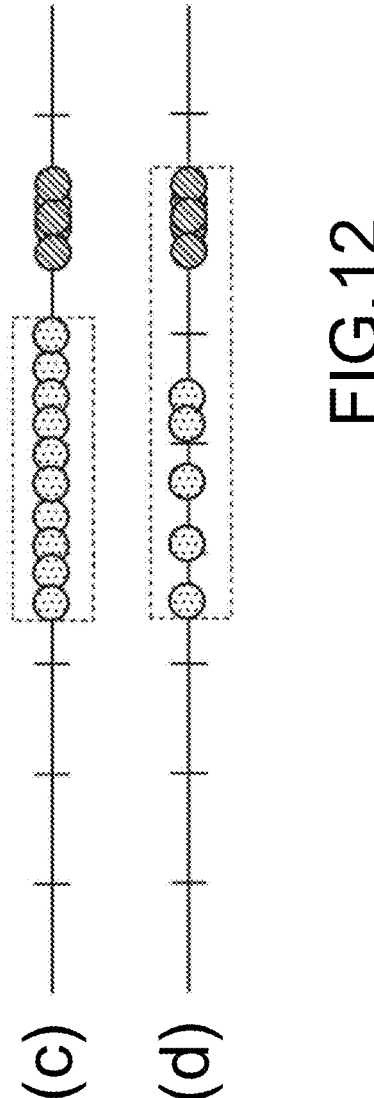
FIG. 12 illustrates the data of the queue for stabilizing the display screen under the perpendicular-plane control according to one embodiment of the present disclosure.

FIG. 12 illustrates the data of the queue for stabilizing the display screen under the perpendicular-plane control according to one embodiment of the present disclosure.

FIG. 12 illustrates four patterns of the standard deviation of the data in the queue related to the current data.

In pattern (a), when the current data falls within the range of the standard deviation of the data in the queue, it indicates that the driver's head does not sway drastically, and the current data may be involved in the update of the standard deviation (e.g., the first determination of step S1130 satisfies the requirement and the process goes to step S1140).

In pattern (b), when the current data falls outside the range of the standard deviation of the data in the queue, it indicates that the current data should not be involved in the sample of calculating the basis for determining whether the driver concentrates on driving, on the contrary, the current data should be regarded as the noise and be excluded (e.g., the first determination of step S1130 does not satisfy the requirement and the process goes back to step S1110).

In pattern (c), when the current data and numerous data before the current data all fall outside the range of the standard deviation of the data in the queue, it indicates that the driver's behavior changes from the concentration condition and the current data should not be regarded as the noise (e.g., the second determination of step S1130 satisfies the requirement and the process goes to step S1140). At this time, the current data is involved in the computation of the second average and used to scale the field of view of the display screen shown on the display device 340. After the standard deviation is updated, as shown in pattern (d), the current data and several latest data fall within the range of the standard deviation.

Therefore, the indirect vision system 300 and the indirect vision display method of the disclosure may provide the image frame with the field of view related to the movement of the driver's head and assure the stabilized effect of the field of view when the field of view is changed, so the problem that the driver sees the display screen changing dramatically and is disturbed by the unstable display screen to be unable to interpret the image properly is solved. The disclosure provides the driver with a comfortable viewing experience to concentrate on the traffic conditions, so driving safety is improved.

Figure 13:
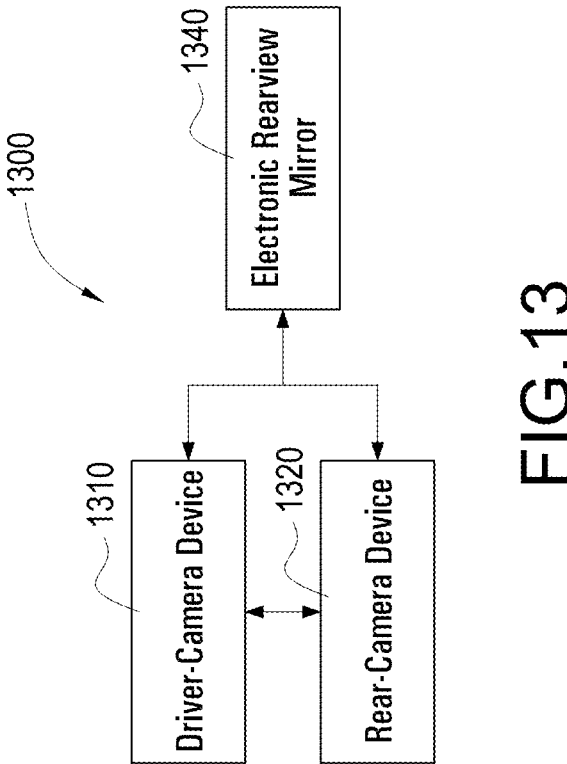
FIG. 13 is a circuit block diagram of the interactive electronic rearview mirror according to one embodiment of the present disclosure.

FIG. 13 is a circuit block diagram of the interactive electronic rearview mirror system according to one embodiment of the present disclosure.

The interactive electronic rearview mirror system 1300 includes a driver camera device 1310, a rear-camera device 1320, and an electronic rearview mirror 1340. The electronic rearview mirror 1340 is respectively connected to the driver-camera device 1310 and the rear-camera device 1320.

The driver-camera device 1310 is arranged on the front side of the vehicle and interior of the vehicle (not shown in the figures) and shoots toward the driver's seat to capture the first image frame.

The rear-camera device 1320 is arranged on the rear side of the vehicle and shoots toward the scene behind the vehicle to capture the second image frame.

The electronic rearview mirror 1340 is arranged on the front side of the vehicle and the interior of the vehicle to display the second image frame toward the driver's seat for the driver.

In one embodiment, the driver-camera device 1310 performs the operations as follows.

In operation (a), the driver-camera device 1310 computes the six-axis moving direction of the eye-point position of the driver in the three-dimensional space by using the current first image frame and another first image frame of the reference time. The six-axis moving direction may be the moving direction in the X-axis direction, the Y-axis direction, and the Z-axis direction.

In operation (b), the driver-camera device 1310 computes the displacement of the eye-point position in the six-axis moving direction including an upward-and-downward displacement (such as the moving direction of the Z-axis direction of FIG. 2) and a left-and-right displacement (such as the moving direction of the X-axis direction of FIG. 2).

In operation (c), the driver-camera device 1310 computes the current perpendicular-plane displacement (such as the moving direction of the Y-axis direction of FIG. 2) between the eye-point position of the driver and the electronic rearview mirror 1340 in the six-axis moving direction.

In operation (d), when determining that the variety of the current perpendicular-plane displacement is smaller than the standard deviation of all the perpendicular-plane displacement in the queue, or the current first image frame is the continuous Nth image frames when the perpendicular-plane displacement is greater than the standard deviation, the driver-camera device 1310 stores the current perpendicular-plane displacement to the queue to update the data of the queue and the standard deviation. In one embodiment, N is a positive integer, such as 5.

In operation (e), the driver-camera device 1310 changes the field of view of the second image frame in the upward-and-downward direction or the left-and-right direction shown on the electronic rearview mirror 1340 according to the first average of the upward-and-downward displacement and the left-and-right displacement. Furthermore, the driver-camera device 1310 scales up or down the field of view of the second image frame shown on the electronic rearview mirror 1340 according to the second average of all the perpendicular-plane displacements updated in the queue.

In the operation of the parallel-plane control, the driver may see the display screen shift correlated to the left on the electronic rearview mirror 1340 when the head moves to the right related to the electronic rearview mirror 1340; the driver may see the display screen shift correlated to the downward on the electronic rearview mirror 1340 when the head moves to the upward related to the electronic rearview mirror 1340; the driver may see the display screen shift correlated to the upward on the electronic rearview mirror 1340 when the head moves to the downward related to the electronic rearview mirror 1340.

In the operation of the perpendicular-plane control, when the head moves forward correlated to the electronic rearview mirror 1340, the driver may see the display screen with a broader view angle (i.e., wider on the left and right side and the field of view including further left and further right scene) than the prior image on the electronic rearview mirror 1340 and the field of view with smaller objects (because the image size is fixed, the image contains more information than before); when the head moves backward correlated to the electronic rearview mirror 1340, the driver may see the display screen with a smaller view angle than the prior image on the electronic rearview mirror 1340 and the field of view with larger objects.

As described above, the indirect vision system, the indirect vision display method, and the interactive electronic rearview mirror system of the disclosure exploit the simulated optical imaging principle to ameliorate the conventional rearview mirror without changing the driver's experience, providing the driver to see the display device or the electronic rearview mirror with any sitting position while the driver sits on the driver's seat to retrieve the demanded view area and providing the effect of correlation between the driver and the display screen is improved.

Moreover, the second camera device and the rear-camera device are arranged at the rear of the vehicle, so it is ensured that the viewable area is not obscured by the vehicle pillars. The indirect vision display method of the disclosure allows the driver to move the head to change the target point or the eye-point position, so the field of view of the image may be adjusted immediately for the sake of confirming the blind spot around the vehicle.

Furthermore, the disclosure provides the average-and-stable mechanism in the time domain to prevent the uncomfortable viewing experience of the image flickering caused by the driver's swaying head. In the disclosure, the driver will not feel that the image is over-adjusted and experience a better viewing effect.

In addition, the disclosure is compatible with the United Nations vehicle safety regulations UN-R46/04 regulating each type of vehicle and also compatible with the performance and installation requirements for indirect vision devices in motor vehicles in China GB-T/15084.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

16

What is claimed is:

1. An indirect vision system, comprising:
   a first camera device, shooting toward a first scene to capture a first image frame;
   a second camera device, shooting toward a second scene to capture a second image frame;
   a display device, connected to the second camera device and displaying the second image frame; and
   a processor, connected to the first camera device and the second camera device and performing operations of:
      computing a six-axis moving direction of a target point in a three-dimensional space by using a current first image frame and another of the first image frame within a reference time;
      computing a displacement between the target point and the display device in the six-axis moving direction; and
      changing a field of view of the second image frame shown on the display device according to the displacement.

2. The indirect vision system of claim 1, wherein the processor computing the displacement between the target point and the display device in the six-axis moving direction comprises operations of:
   computing a parallel-plane displacement between the target point and the display device in the six-axis moving direction.

3. The indirect vision system of claim 2, wherein the processor changing the field of view of the second image frame shown on the display device according to the displacement comprises performing operations of:
   changing the field of view of the second image frame shown on the display device according to a first average of the parallel-plane displacements.

4. The indirect vision system of claim 3, wherein the processor changing the field of view of the second image frame shown on the display device according to the first average of the parallel-plane displacement comprises performing operations of:
   when the target point moves toward a first direction, controlling the display device to change the field of view of the second image frame toward a second direction shown on the display device, wherein the first direction and the second direction are opposite directions, and the first direction and the second direction are both upward-and-downward direction or left-and-right direction.

5. The indirect vision system of claim 1, wherein the processor computing the displacement between the target point and the display device in the six-axis moving direction comprises performing operations of:
   computing a current perpendicular-plane displacement between the target point and the display device in the six-axis moving direction.

6. The indirect vision system of claim 5, wherein the processor changing the field of view of the second image frame shown on the display device according to the displacement comprises performing operations of:
   when a variation of a current perpendicular-plane displacement is smaller than a standard deviation of all the perpendicular-plane displacements stored in a queue or the current first image frame is a continuous Nth image frame when the current perpendicular-plane displacement is greater than the standard deviation, storing the current perpendicular-plane displacement to the queue and update the standard deviation, wherein N is a positive integer; and scaling the field of view of the second image frame according to a second average of all the perpendicular-plane displacements of the queue.

7. The indirect vision system of claim 6, wherein after computing the perpendicular-plane displacement, the processor performs operations of:

if determining a quantity of the perpendicular-plane displacement stored in the queue is smaller than a capacity of the queue, storing the current perpendicular-plane displacement to the queue.

8. The indirect vision system of claim 6, wherein after storing the current perpendicular-plane displacement to the queue and updating the standard deviation, the processor performs operations of:

updating the second average of all the perpendicular-plane displacements of the queue and updating a scaling rate by using the second average, wherein the scaling rate is used to zoom in or zoom out the field of view of the second image frame shown on the display device.

9. The indirect vision system of claim 6, wherein the processor performs operations of:

when the target point moves toward the display device in a direction perpendicular to the display device, controlling the display device to scale up the field of view of the second image frame shown on the display device; and when the target point moves backward related to the display device with the direction perpendicular to the display device, controlling the display device to scale down the field of view of the second image frame shown on the display device.

10. The indirect vision system of claim 1, wherein the processor performs operations of:

when the target point is not detected in the current first image frame, controlling the display device to show the second image frame with a default field of view.

11. An indirect vision display method applied to an indirect vision system comprising a first camera device, a second camera device, a display device connected to the second camera device, and a processor connected to the first camera device and the second camera device, wherein the indirect vision display method comprising:

shooting toward a first scene to capture a first image frame by the first camera device;

shooting toward a second scene to capture a second image frame by the second camera device;

computing a six-axis moving direction of a target point in a three-dimensional space by using a current first image frame and another of the first image frame of a reference time by the processor;

computing a displacement between the target point and the display device in the six-axis moving direction by the processor; and changing a field of view of the second image frame shown on the display device according to the displacement by the processor.

12. The indirect vision display method of claim 11, comprising:

computing the displacement between the target point and the display device in the six-axis moving direction by the processor;

computing a parallel-plane displacement between the target point and the display device in the six-axis moving direction by the processor; and when the target point is not detected in the current first image frame, controlling the display device to show the second image frame with a default field of view by the processor.

13. The indirect vision display method of claim 12, comprising:

changing the field of view of the second image frame shown on the display device according to the displacement by the processor; and changing the field of view of the second image frame shown on the display device according to a first average of the parallel-plane displacement by the processor.

14. The indirect vision display method of claim 13, comprising:

changing the field of view of the second image frame shown on the display device according to the first average of the parallel-plane displacements by the processor; and when the target point moves toward a first direction, controlling the display device to change the field of view of the second image frame toward a second direction shown on the display device, wherein the first direction and the second direction are opposite directions, and the first direction and the second direction are both upward-and-downward direction or left-and-right direction.

15. The indirect vision display method of claim 11, comprising:

computing the displacement between the target point and the display device in the six-axis moving direction by the processor;

computing a current perpendicular-plane displacement between the target point and the display device in the six-axis moving direction; and when the target point is not detected in the current first image frame, control the display device to show the second image frame with a default field of view.

16. The indirect vision display method of claim 15, comprising:

changing the field of view of the second image frame shown on the display device according to the displacement by the processor; and when a variation of a current perpendicular-plane displacement is smaller than a standard deviation of all the perpendicular-plane displacements stored in a queue or the current first image frame is a continuous Nth image frame when the current perpendicular-plane displacement is greater than the standard deviation, storing the current perpendicular-plane displacement to the queue and updating the standard deviation by the processor, wherein N is a positive integer; and scaling the field of view of the second image frame according to a second average of all the perpendicular-plane displacements of the queue by the processor.

17. The indirect vision display method of claim 16, comprising:

after computing the perpendicular-plane displacement by the processor, if determining a quantity of the perpendicular-plane displacement stored in the queue is smaller than a capacity of the queue, storing the current perpendicular-plane displacement to the queue by the processor.

18. The indirect vision display method of claim 16, comprising:

after storing the current perpendicular-plane displacement to the queue and updating the standard deviation, updating the second average of all the perpendicular-plane displacements of the queue, and updating a scaling rate by using the second average, wherein the scaling rate is used to zoom in or zoom out the field of view of the second image frame shown on the display device.

19. The indirect vision display method of claim 16, comprising:

when the target point moves toward the display device in a direction perpendicular to the display device, controlling the display device to scale up the field of view of the second image frame shown on the display device by the processor; and when the target point moves backward related to the display device with the direction perpendicular to the display device, controlling the display device to scale down the field of view of the second image frame shown on the display device by the processor.

20. An interactive electronic rearview mirror system for vehicles, comprising:

a driver-camera device, arranged on a front side of the vehicle and interior of the vehicle and shooting toward a driver seat to capture a first image frame;

a rear-camera device, arranged on a rear side of the vehicle and shooting toward a scene behind the vehicle to capture a second image frame;

an electronic rearview mirror, arranged on the front side and interior of the vehicle, connected to the driver-camera device and the rear-camera device, and showing the second image frame toward the driver seat;

wherein the driver-camera device performs operations of:

computing a six-axis moving direction of a driver eye-point position in a three-dimensional space by using a current first image frame and another of the first image frame of a reference time;

computing an upward-and-downward displacement and a left-and-right displacement of the driver eye-point position in the six-axis moving direction;

computing a current perpendicular-plane displacement between the driver eye-point position and the electronic rearview mirror in the six-axis moving direction;

when a variation of the current perpendicular-plane displacement is smaller than a standard deviation of all the perpendicular-plane displacements of a queue or the current first image frame is the Nth continuous image frame when the current perpendicular-plane displacement is greater than the standard deviation, storing the current perpendicular-plane displacement to the queue and update the standard deviation, wherein N is a positive integer; and changing the field of view of the second image frame shown on the electronic rearview mirror with upward-and-downward or left-and-right according to a first average of the upward-and-downward displacement or the left-and-right displacement, and scaling the field of view of the second image frame shown on the electronic rearview mirror according to a second average of all the perpendicular-plane displacements of the queue.

* * * * *